W. MURRY & J. CONWAY.
WHEEL.
APPLICATION FILED MAY 4, 1915.

1,179,743.

Patented Apr. 18, 1916.
2 SHEETS—SHEET 1.

Witnesses
M. D. Slifer
Frank Hough

Inventors
William Murry and
John Conway
By Victor J. Evans
Attorney

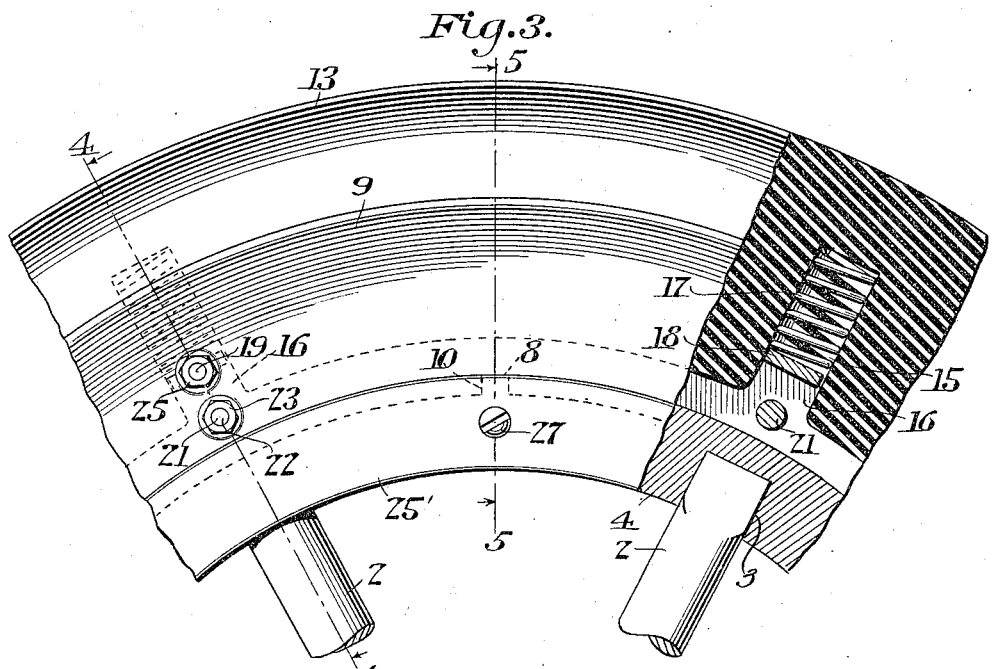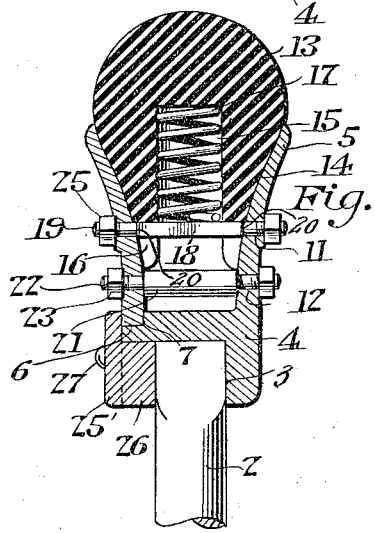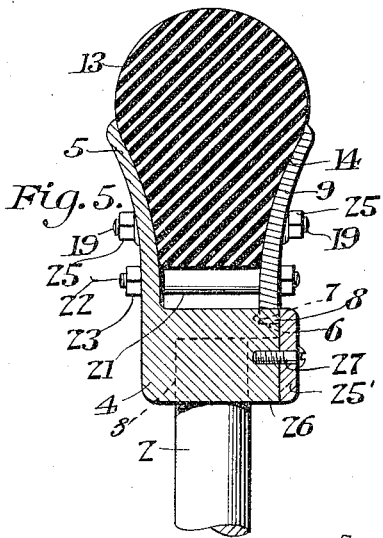

UNITED STATES PATENT OFFICE.

WILLIAM MURRY AND JOHN CONWAY, OF SHREWSBURY, MASSACHUSETTS.

WHEEL.

1,179,743.   Specification of Letters Patent.   Patented Apr. 18, 1916.

Application filed May 4, 1915. Serial No. 25,782.

*To all whom it may concern:*

Be it known that we, WILLIAM MURRY and JOHN CONWAY, citizens of the United States, residing at Shrewsbury, in the county of Worcester and State of Massachusetts, have invented new and useful Improvements in Wheels, of which the following is a specification.

This invention relates to a wheel designed to be used upon a vehicle or similar conveyance, and of the type which are constructed in such a manner as to obviate the use of a pneumatic tire, yet to absorb the shocks and jars incident to the travel of the vehicle.

The primary object of the invention is to provide a relatively solid tire for a wheel of this character in which a plurality of resilient tire supporting members are disposed in the tire in such a manner as to prevent the cutting of the tire by the tire clamping flanges upon the rim of the wheel when in use.

A further object of the invention is to provide a tire of this type which may be easily attached or detached from the rim of a wheel to which the tire is applied and to provide means for fastening the said tire to the flanges upon the rim which also support the resilient tire supporting members contained within the tire.

A still further object of the invention is to provide means for fastening the tire between the flanges upon the rim which will limit the clamping action of the flanges upon the tire in one direction.

A still further object of the invention is to provide a wheel of the class described, which is constructed in such a manner as to permit either the tire or the rim upon the wheel being removed therefrom, independent of each other, when desired.

The invention consists in the improved construction and novel arrangement and combination of parts which will be hereinafter fully described and particularly pointed out in the claims.

The preferred embodiment of the invention has been illustrated in the accompanying drawing, but no restriction is necessarily made to the precise details of construction therein shown, as changes, alterations and modifications within the scope of the claims may be resorted to when desired.

Figure 1:
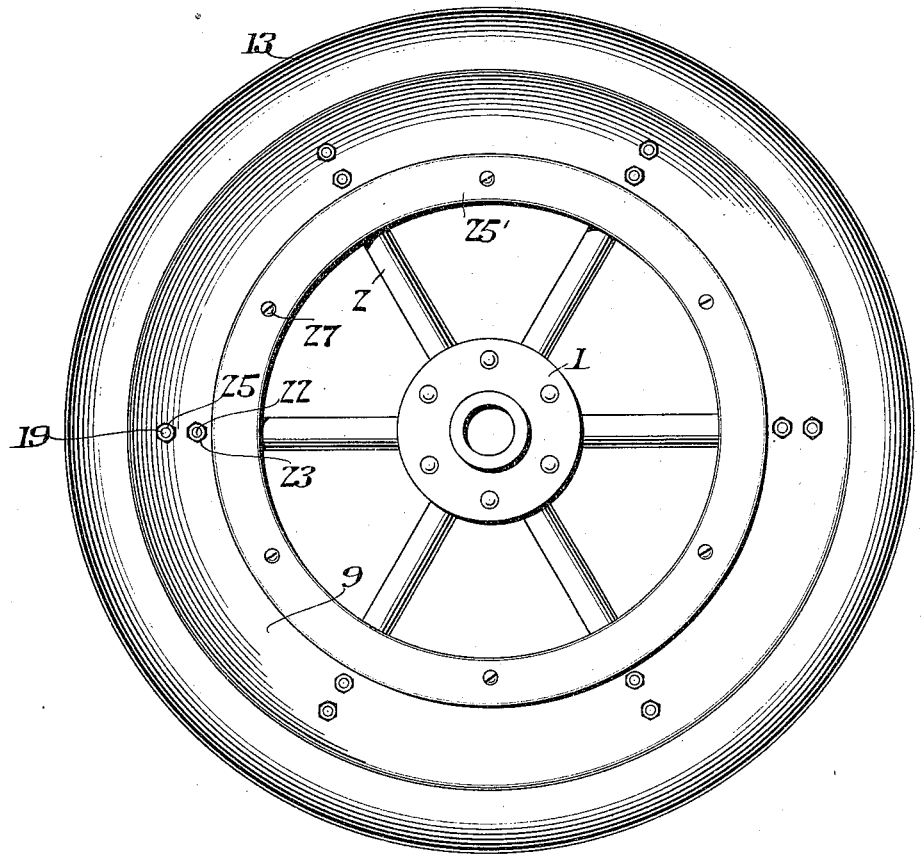
Figure 2:
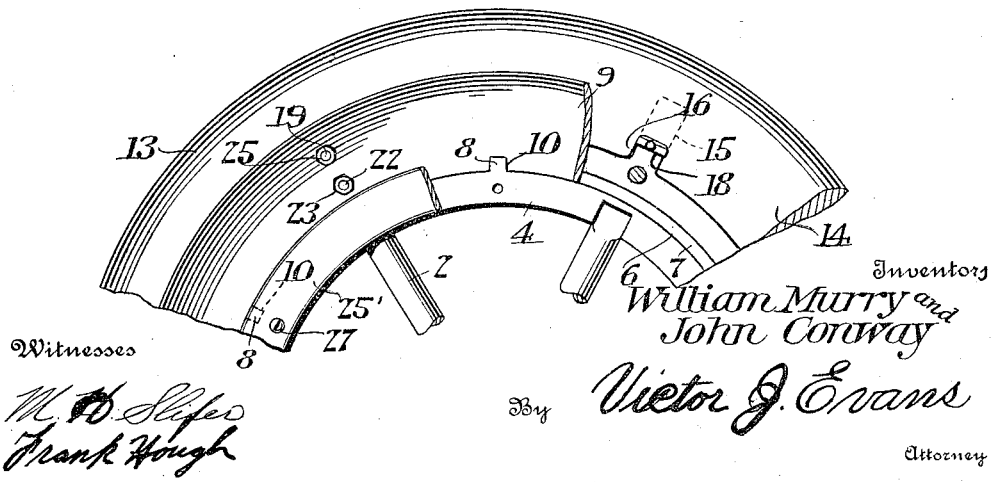

In the drawings—Figure 1 is a side elevation of a wheel constructed in accordance with the invention. Fig. 2 is a similar view showing the removable tire and spoke clamping rim partially broken away and the tire partly in section. Fig. 3 is an enlarged fragmentary side elevation of a portion of the wheel, parts thereof being broken away and shown in section. Fig. 4 is a transverse vertical sectional view taken on the line 4—4 of Fig. 3. Fig. 5 is a similar view to Fig. 4 taken on the line 5—5 of Fig. 3.

Like characters of reference denote corresponding parts throughout the several views of the drawings.

The numeral 1 designates the hub of a wheel, which may be of the usual well known construction and 2 the spokes therein which are adapted to have their outer ends disposed within spoke receiving notches 3 in a rim 4. The rim 4 is provided upon one side thereof with an upstanding and outwardly flared tire clamping flange 5 while the opposite side of the rim 4 is provided with an annular groove 6 forming a shoulder 7 and provided with a plurality of spaced lugs 8. Disposed within the groove 6 in the rim 4 is a tire clamping flange 9 similar in shape to the tire clamping flange 5 and provided upon its bottom peripheral edge with circumferentially arranged notches 10, said notches being adapted to receive the lugs 8 when the flange 9 is in tire clamping position. Each of the tire clamping flanges 5 and 9 are provided with circumferentially arranged apertures 11 and 12, the openings 11 and 12 in the removable tire clamping flange 9 being in transverse alinement with the openings 11 and 12 in the tire clamping flange 5.

The numeral 13 indicates a tire the sides 14 of which are adapted to conform in shape to the convex faces of the tire clamping flanges 5 and 9. The tire 13 is provided in its inner peripheral face with spaced and outwardly extending spring receiving pockets 15, which are radially disposed within the tire in relation to the hub 1 of the wheel. Arranged circumferentially about and opening out through the lower edge of each side 14 of the tire 13 are a series of rectangular shaped recesses 16 which communicate with the spring receiving pockets 15 and which are in transverse alinement with the openings 11 in the tire clamping flanges 5 and 9. Disposed within each of the pockets 15 in the tire 13 is a coiled expansion spring 17 of slightly greater length than the pocket and adapted to maintain the tire in an extended position under the weight of the load imposed on the wheel.

In order that the tire supporting springs 17 may effectually support the tire 13 under a strain rectangular shaped bars 18 are provided the ends of which are reduced and threaded as at 19, the portion of the bars 18 adjacent the reduced ends 19 thereon form shoulders 20 near the opposite ends of the said bars for a purpose hereinafter described.

In order that the flanges 5 and 9 may effectually clamp a tire 13 when inserted there between, bolts 21 are provided, the reduced ends 22 of which are disposed within the openings 12 in the flanges 5 and 9, said ends 22 being threaded and adapted to receive nuts 23 which when adjusted thereon force the flanges 5 and 9 against the tire 13 with a clamping action. To assist the bolts 21 to clamp the rims 5 and 9 against the tire 13 and to support the springs 17 in the pockets 15 under a tension the members 18 are inserted through the recesses 16 in the side of the tire 13 and beneath the springs 17 and the ends 19 of said members pass through the openings 11 in the flanges 5 and 9 in which position the ends 19 are adapted to receive nuts 25, the adjustment of which on the threaded ends 19 will cause the flanges 5 and 9 to have a greater clamping action against the tire 13, while the shoulders 20 upon the member 18 prevents the tire 13 from being compressed to such a degree as to render the springs 17 inoperative.

In order that the spokes and hub may be removed from the felly of the wheel when desired an annular plate 25' is provided having upon one face thereof a series of spaced lugs 26 adapted for disposition within the spoke receiving pockets in the rim 4 and when in such position to maintain the spokes within said pockets. The plate 25' is adapted to be secured to the rim 4 through the medium of screws 27.

From the foregoing description taken in connection with the accompanying drawings it is readily apparent that a wheel construction has been provided which permits the use of a relatively solid tire, and one wherein the said tire and rim are independently removable from the wheel when desired. It will also be apparent that a wheel structure has been provided which is inexpensive of manufacture, simple in construction, yet highly efficient in use.

Having thus described the invention what is claimed as new is:—

1. In a wheel, a rim having spaced and outstanding flanges, bars passing transversely through said flanges, a tire disposed between said flanges and provided on its inner peripheral face with spaced radially extending pockets, and coil springs disposed within said pockets and bearing upon said bars.

2. In a wheel, a rim having spaced and outwardly extending tire clamping flanges, a tire interposed between said flanges and provided on its inner peripheral face with spaced and radially extending pockets, said tire having recesses upon opposite sides communicating with said pockets adjacent the inner peripheral face of the tire, coil springs disposed within said pockets, and bars passing through said flanges and received in said recesses to support said springs.

3. In a wheel, a rim having spaced and outwardly extending tire clamping flanges provided with spaced openings, a tire disposed between said flanges and provided upon opposite sides with recesses opening out through the inner peripheral face thereof and spaced and radially extending pockets having their inner ends opening out through the inner peripheral face of the tire and communicating with said recesses, coil springs within said pockets, and flat bars having reduced ends received in the openings in the flanges and with the outer faces of the bars between the reduced ends thereon contacting with the outer walls of the recesses and the inner ends of the springs.

In testimony whereof we affix our signatures in presence of two witnesses.

WILLIAM MURRY.
JOHN CONWAY.

Witnesses:
FRANK L. OTT,
EDWARD A. LOGAN.

Copies of this patent may be obtained for five cents each, by addressing the "Commissioner of Patents, Washington, D. C."